United States Patent
Kaneko et al.

(10) Patent No.: US 9,434,341 B2
(45) Date of Patent: Sep. 6, 2016

(54) VEHICULAR SEAT

(71) Applicant: TOYOTA JIDOSHA KABUSHIKI KAISHA, Toyota-shi, Aichi (JP)

(72) Inventors: Akira Kaneko, Toyota (JP); Shunsuke Tanaka, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/763,779

(22) PCT Filed: Feb. 12, 2014

(86) PCT No.: PCT/JP2014/053224
§ 371 (c)(1),
(2) Date: Jul. 27, 2015

(87) PCT Pub. No.: WO2014/126116
PCT Pub. Date: Aug. 21, 2014

(65) Prior Publication Data
US 2015/0360636 A1 Dec. 17, 2015

(30) Foreign Application Priority Data
Feb. 12, 2013 (JP) .................................. 2013-024577

(51) Int. Cl.
*B60R 21/207* (2006.01)
*B60R 21/217* (2011.01)
*B60N 2/44* (2006.01)
(Continued)

(52) U.S. Cl.
CPC ............. *B60R 21/207* (2013.01); *B60N 2/449* (2013.01);
(Continued)

(58) Field of Classification Search
CPC ............................................. B60N 2002/5808
See application file for complete search history.

(56) References Cited

U.S. PATENT DOCUMENTS

| 7,584,990 B2* | 9/2009 | Suyama ................ B60R 21/207 280/730.2 |
| 8,844,966 B2* | 9/2014 | Feller .................... B60R 21/207 280/728.2 |
| 2008/0136237 A1 | 6/2008 | Kayumi et al. |
| 2012/0043791 A1 | 2/2012 | Kojima |

FOREIGN PATENT DOCUMENTS

| DE | 10 2008 053 080 A1 | 4/2010 |
| JP | H01-63442 U | 4/1989 |

(Continued)

OTHER PUBLICATIONS

Partial Translation of Written Opinion of the International Searching Authority (form PCT/ISA/237) issued in International Patent Application No. PCT/JP2014/053224.

*Primary Examiner* — Nicole Verley
(74) *Attorney, Agent, or Firm* — Oliff PLC

(57) ABSTRACT

In a vehicular seat, a side airbag module and a side support bladder are arranged inside a shell frame that constitutes a skeleton of a seat back. A base bracket of a support body is disposed between the side support bladder and the side airbag module. This base bracket is supported by the shell frame. The base bracket supports the side support bladder from outside in a seat width direction at the time of inflation of the side support bladder, and is rotated inward in the seat width direction around a hinge together with the side support bladder due to an inflation pressure of a side airbag at the time of inflation and deployment of the side airbag.

8 Claims, 8 Drawing Sheets

(51) Int. Cl.
*B60N 2/68* (2006.01)
*B60R 21/231* (2011.01)
*B60N 2/58* (2006.01)

(52) U.S. Cl.
CPC .............. *B60N 2/68* (2013.01); *B60R 21/217* (2013.01); *B60R 21/23138* (2013.01); *B60N 2002/5808* (2013.01); *B60R 21/2176* (2013.01); *B60R2021/2178* (2013.01); *B60R 2021/23146* (2013.01)

(56) References Cited

FOREIGN PATENT DOCUMENTS

| | | |
|---|---|---|
| JP | 2008-143363 A | 6/2008 |
| JP | 2010-279488 A | 12/2010 |
| WO | 2010/131322 A1 | 11/2010 |

\* cited by examiner

VEHICULAR SEAT

TECHNICAL FIELD

The invention relates to a vehicular seat that is equipped with a side airbag device and an air bag-type side support adjustment mechanism.

BACKGROUND ART

For example, in a vehicular seat described in WO 2010/131322, a side airbag module is attached to an outer side of a side frame portion of a seat back frame in a seat width direction. Besides, a mechanical side support adjustment mechanism is attached to an inner side of the side frame portion in the seat width direction. This side support adjustment mechanism drives a paddle constituting a skeleton of a side support with the aid of a drive mechanism, thereby displacing the side support in the seat width direction. Part of the aforementioned paddle is located in an inflation and deployment region of a side airbag. At the time of inflation and deployment of the side airbag, the paddle receives an inflation pressure of the side airbag, and is displaced inward in the seat width direction. Thus, the side airbag is deployed in a favorable manner.

On the other hand, in a vehicular seat described in Japanese Patent Application Publication No. 2008-143363 (JP 2008-143363 A), a side airbag module is attached to an outer side of a lateral portion (a side frame portion) of a frame unit of a seat back in a seat width direction. Besides, an air bag-type side support adjustment mechanism is attached to an inner side of the side frame portion in the seat width direction. In this side support adjustment mechanism, an air bag (a bag body) is fixed to the side frame portion via a metallic support bracket. When air is introduced into this air bag, the air bag inflates while receiving a reaction force from the support bracket, and displaces a lateral portion support block (a side support) of the seat back inward in the seat width direction.

SUMMARY OF THE INVENTION

Problem to be Solved by the Invention

In view of the aforementioned facts, the invention provides a vehicular seat that makes it possible to enhance the degree of freedom in arranging a side airbag module with respect to an air bag-type side support adjustment mechanism.

Means for Solving the Problem

In a first aspect of the invention, there is provided a vehicular seat that is equipped with a side airbag device, a side support adjustment mechanism, and a support body. The side airbag device inflates and deploys a side airbag with which a side airbag module that is provided in a side support portion of a seat back is equipped, forward of the side support portion with respect to the seat. The side support adjustment mechanism has an air bag that is provided in the side support portion inside the side airbag module in a seat width direction, and inflates and contracts the air bag. The support body is provided between the side airbag module and the air bag, is supported by a skeleton of the seat back, supports the air bag from outside in the seat width direction at a time of inflation of the air bag, and is displaced inward in the seat width direction together with the air bag due to an inflation pressure of the side airbag at a time of inflation and deployment of the side airbag.

In the aforementioned aspect of the invention, the support body is provided between the side airbag module and the air bag of the side support adjustment mechanism in the side support portion of the seat back. This support body is supported by the skeleton of the seat back. When the air bag inflates, the support body supports the air bag from outside in the seat width direction. Thus, the air bag can be inflated inward in the seat width direction, so the side support portion can be moved inward in the seat width direction due to the inflation pressure of the air bag. Moreover, this support body is displaced inward in the seat width direction together with the air bag due to the inflation pressure of the side airbag, at the time of inflation and deployment of the side airbag. Thus, the inflation and deployment of the side airbag can be prevented from being hindered by the support body. Therefore, the degree of freedom in arranging the side airbag module with respect to the air bag-type side support adjustment mechanism can be enhanced.

A second aspect of the invention may be obtained by modifying the first aspect of the invention such that the support body has an abutment portion that abuts on the skeleton of the seat back from inside in the seat width direction.

According to the aforementioned configuration, the abutment portion of the support body abuts on the skeleton of the seat back from inside in the seat width direction. Therefore, when the air bag inflates, the support body can be firmly supported from outside in the seat width direction due to the rigidity of the skeleton of the seat back. Thus, the support body can be prevented or effectively restrained from being inadvertently displaced outward in the seat width direction. Incidentally, the aforementioned configuration is not limited to a configuration in which the abutment portion of the support body directly abuts on the skeleton of the seat back, but also includes a configuration in which the abutment portion of the support body indirectly abuts on the skeleton of the seat back via a rubber piece, a cloth or the like for preventing abnormal noise.

A third aspect of the invention may be obtained by modifying the first or second aspect of the invention such that the skeleton of the seat back is a shell frame having a rear wall portion that is arranged on a back face side of the seat back, and a lateral wall portion that extends forward with respect to the seat from an end portion of the rear wall portion in the seat width direction, and that the side airbag module and the air bag are arranged inside the lateral wall portion in the seat width direction.

In the aforementioned configuration, the skeleton of the seat back is the shell frame. The air bag-type side support adjustment mechanism and the side airbag module are arranged inside the lateral wall portion of this shell frame in the seat width direction. Even with this configuration, at the time of inflation and deployment of the side airbag, the support body that supports the air bag is displaced inward in the seat width direction together with the air bag, so the side airbag can be allowed to inflate and deploy. Moreover, the design of the back face and lateral face of the seat back can be constituted by the shell frame itself, so the seat back can be reduced in thickness and simplified in configuration.

A fourth aspect of the invention may be obtained by modifying any one of the first to third aspects of the invention such that the support body has a fixed portion that is fixed to the skeleton of the seat back, and a movable portion that is coupled at an end portion thereof on a rear side with respect to the seat to the fixed portion via a hinge and that is arranged between the side airbag module and the air bag, and that the movable portion is allowed to rotate inward in the seat width direction around the hinge, and is restrained from rotating outward in the seat width direction around the hinge.

According to the aforementioned configuration, when the air bag of the side support adjustment mechanism inflates, the air bag is supported from outside in the seat width direction by the movable portion of the support body that is restrained from rotating outward in the seat width direction around the hinge. On the other hand, when the side airbag inflates and deploys, the aforementioned movable portion receives the inflation pressure of the side airbag, and is rotated inward in the seat width direction around the hinge together with the air bag. Thus, the side airbag is allowed to inflate and deploy. As described hitherto, the movable portion of the support body is configured to be rotated around the hinge. Therefore, the movable portion can be smoothly displaced inward in the seat width direction.

A fifth aspect of the invention may be obtained by modifying the fourth aspect of the invention such that the side support adjustment mechanism has a turning plate that is interposed between the air bag and a seat back pad in the side support portion, and that the turning plate is coupled at an end portion thereof on the rear side with respect to the seat to the fixed portion via the hinge.

According to the aforementioned configuration, when the air bag of the side support adjustment mechanism inflates inward in the seat width direction while being supported from outside in the seat width direction by the support body, the turning plate is displaced inward in the seat width direction around the hinge. The seat back pad in the side support portion can be efficiently pressed inward in the seat width direction by this turning plate. Moreover, the hinge to which the turning plate is coupled couples the movable portion of the support body to the fixed portion, and the hinge and the fixed portion are shared. Therefore, the number of parts can be reduced.

A sixth aspect of the invention may be obtained by modifying the first aspect of the invention such that the side airbag module is equipped with an airbag case that accommodates the side airbag therein in a folded state, and that the support body is constituted by a part of the airbag case.

According to the aforementioned configuration, the part of the airbag case with which the side airbag module is equipped is the support body that supports the air bag of the side support adjustment mechanism. Therefore, the support body can be assembled with the seat back by assembling the side airbag module with the seat back. Therefore, the manhour of an assembling operation can be reduced in comparison with a case where the side airbag module and the support body are separately assembled with the seat back.

A seventh aspect of the invention may be obtained by modifying the sixth aspect of the invention such that the support body has an abutment portion that abuts on another part of the airbag case from inside in the seat width direction.

According to the aforementioned configuration, the abutment portion of the support body abuts on the other part of the airbag case from inside in the seat width direction. Therefore, when the air bag inflates, the support body can be thinly supported from outside in the seat width direction due to the rigidity of the other part of the airbag case. Thus, the support body can be prevented or effectively restrained from being inadvertently displaced outward in the seat width direction. Incidentally, the aforementioned configuration is not limited to a configuration in which the abutment portion of the support body directly abuts on the other part of the airbag case, but also includes a configuration in which the abutment portion of the support body indirectly abuts on the other part of the airbag case via a rubber piece, a cloth or the like for preventing abnormal noise.

An eighth aspect of the invention may be obtained by modifying the seventh aspect of the invention such that the side support adjustment mechanism has a turning plate that is interposed between the air bag and a seat back pad in the side support portion, and that the turning plate is coupled to a hook shaft that is formed on a part of the support body, via a hook portion that is provided at an end portion of the turning plate on a rear side with respect to the seat.

According to the aforementioned configuration, when the air bag of the side support adjustment mechanism inflates inward in the seat width direction while being supported from outside in the seat width direction by the support body, the turning plate is displaced inward in the seat width direction around the hook shaft via the hook portion that is provided at the end portion of the turning plate on the rear side with respect to the seat. The seat back pad in the side support portion can be efficiently pressed inward in the seat width direction by this turning plate.

Effect of the Invention

As described above, the vehicular seat according to the invention makes it possible to enhance the degree of freedom in arranging the side airbag module with respect to the air bag-type side support adjustment mechanism.

MODES FOR CARRYING OUT THE INVENTION

First Embodiment

A vehicular seat 10 according to an embodiment of the invention will be described hereinafter, using FIGS. 1 to 4. Incidentally, outer sides of the vehicular seat 10 in a forward direction, an upward direction, and a width direction (a lateral direction) are denoted respectively by arrows FR, UP, and OUT that are shown in the respective drawings if appropriate. Besides, in the present embodiment of the invention, the longitudinal, lateral and vertical directions of the vehicular seat 10 coincide with the longitudinal, lateral and vertical directions of the vehicle respectively. The front and rear in the longitudinal direction of the seat, the right and left in the lateral direction of the seat, and the up and down of the vertical direction of the seat will be indicated unless otherwise specified in particular, in the case where a description is given referring simply to the longitudinal, lateral and vertical directions.

Configuration

Figure 1:
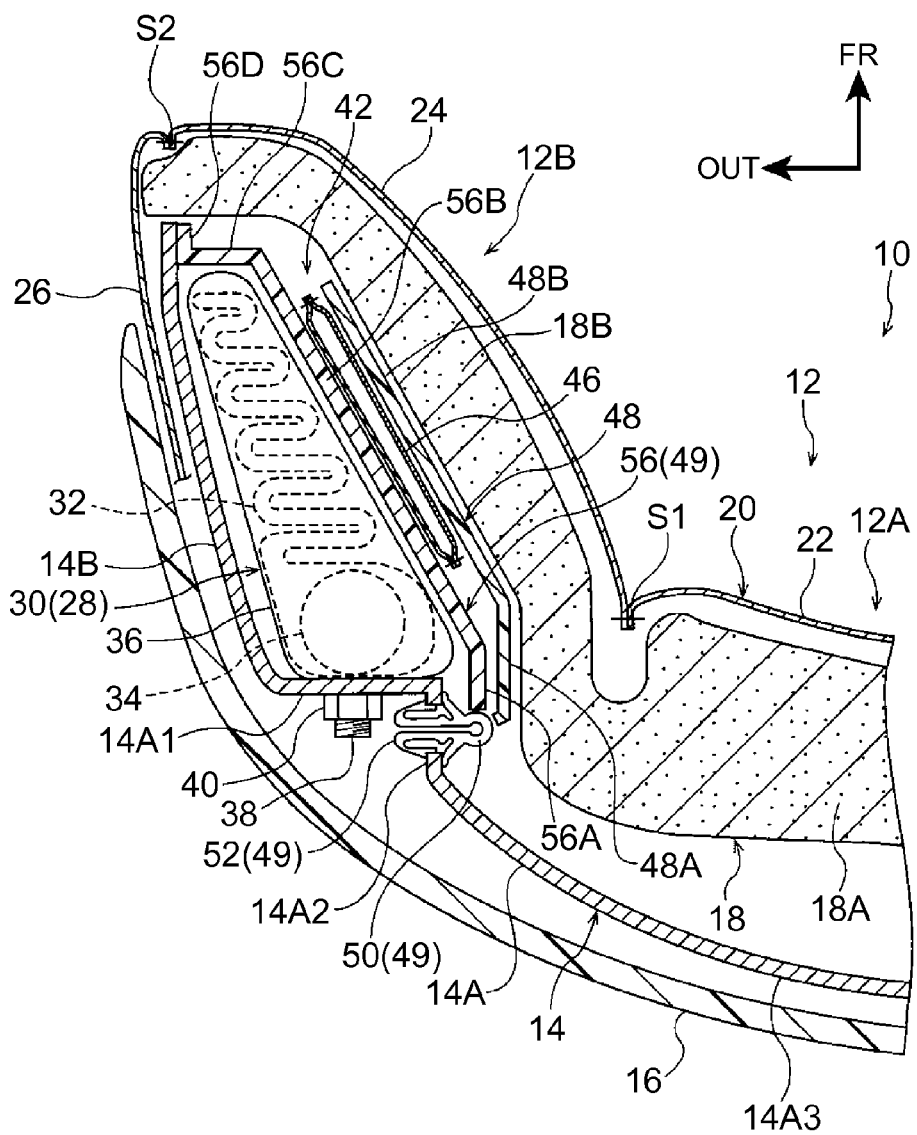
FIG. 1 is a planar cross-sectional view showing the configuration around a side support portion of a seat back of a vehicular seat according to a first embodiment of the invention, and corresponding to a line F1-F1 of FIG. 2.
Figure 2:
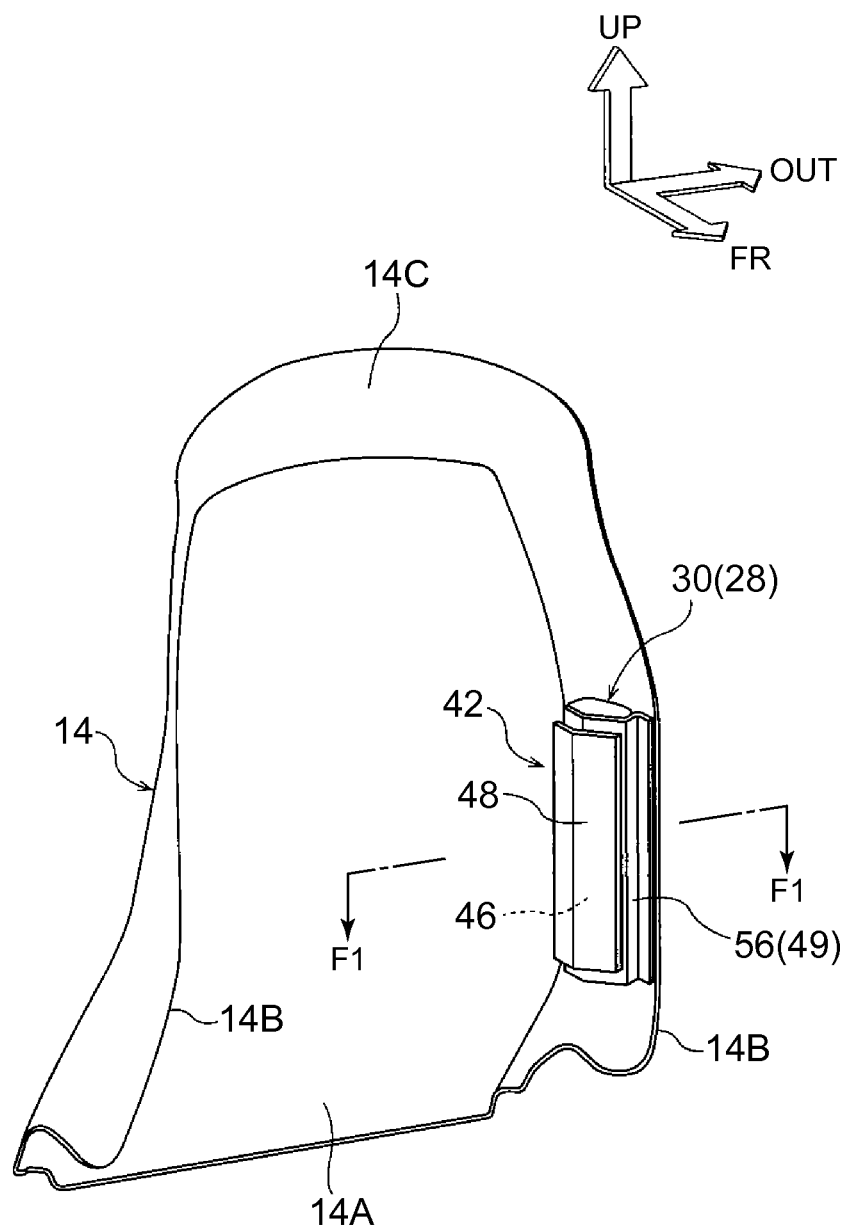
FIG. 2 is a perspective view showing the configuration of peripheral members including a shell frame as a skeleton of the seat back.
Figure 3:
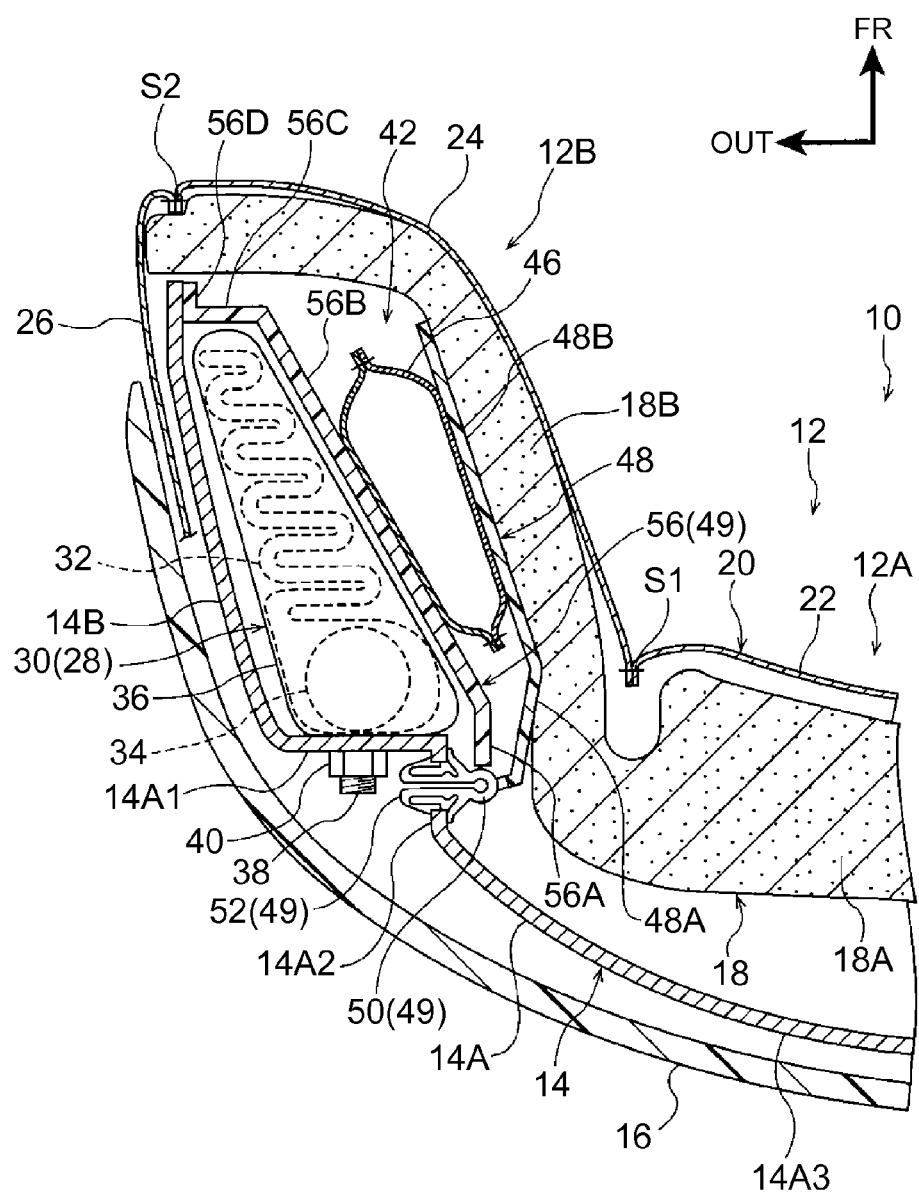
FIG. 3 is a planar cross-sectional view showing an inflated state of a side support bladder, and corresponding to FIG. 1.

As shown in FIG. 1, in the vehicular seat 10 according to the present embodiment of the invention, a skeleton of a seat back 12 is constituted by a shell frame 14. As shown in FIG. 2, this shell frame 14 is constituted of a rear wall portion 14A, right and left lateral wall portions 14B that protrude forward with respect to the seat from both end portions of the rear wall portion 14A in a seat width direction respectively, and an upper wall portion 14C that protrudes forward with respect to the seat from an upper end portion of the rear wall portion 14A. The shell frame 14 is formed in the shape of a hull (the shape of a shell) such that a front side thereof with respect to the seat is open. The rear wall portion 14A is arranged on a back face side of the seat back 12. The right and left lateral wall portions 14B are arranged on lateral face sides of the seat back 12 respectively. This shell frame 14 is covered with a resinous backboard 16 from a rear side with respect to the seat and from both outer sides in the seat width direction respectively.

A seat back pad 18 (a urethane pad, which is not shown in FIG. 2) as a cushion material is attached to a front side of the shell frame 14 with respect to the seat. This seat back pad 18 is covered with a seat back skin 20 as a skin material, from the front side with respect to the seat.

The aforementioned seat back 12 is equipped with a body portion 12A that supports a back of a sitting passenger from the rear side with respect to the seat, and right and left side support portions 12B that are provided on both sides of the body portion 12A in the seat width direction respectively (the side support portion 12B that is located on the right side with respect to the seat is not shown in FIG. 1). The right and left side support portions 12B protrude forward of the body portion 12A with respect to the seat, and is configured to support an upper body of the sitting passenger laterally.

The seat back pad 18 is integrally equipped with a pad body portion 18A that is provided at the body portion 12A, and right and left pad side portions 18B that are provided at the right and left side support portions 12B respectively (the pad side portion 18B that is located on the right side with respect to the seat is not shown in FIG. 1). The pad side portion 18B diagonally extends forward with respect to the seat and outward in the seat width direction from an outer end portion of the pad body portion 18A in the seat width direction.

Besides, the seat back skin 20 is constituted of a front skin 22 that covers the pad body portion 18A from the front side with respect to the seat, a front side skin 24 that covers the pad side portion 18B from the front side with respect to the seat and from inside in the seat width direction, and a side skin 26 that covers the pad side portion 18B from outside in the seat width direction.

An outer end portion of the front skin 22 in the seat width direction is sewn to an inner end portion of the front side skin 24 in the seat width direction at a sewing portion S1. An outer end portion of the front side skin 24 in the seat width direction is sewn to a front end portion of the side skin 26 at a sewing portion S2. This side skin 26 is inserted in a gap between the lateral wall portion 14B of the shell frame 14 and the backboard 16 on a lateral face side of the seat back 12, and extends backward with respect to the seat. A rear end portion (not shown) of the side skin 26 is engaged with the shell frame 14. Incidentally, the aforementioned sewing portion S2 is configured to be ruptured when a later-described side airbag 32 inflates and deploys.

As shown in FIG. 1, a side airbag module 30 that constitutes a main portion of a side airbag device 28 is disposed in the side support portion 12B on the left side with respect to the seat (on a side door side (not shown) in this case). The side airbag module 30 is equipped with the side airbag 32 that is formed in the form of a bag by sewing a base fabric of, for example, nylon type or polyester type, and an inflator 34 (a gas generating device) that is accommodated inside the side airbag 32. The side airbag 32 is folded according to a predetermined folding pattern (an accordion folding pattern in this case), and is wrapped by a wrapping material 36 that easily ruptures due to an inflation pressure of the side airbag 32.

The inflator 34 is of a cylinder type, and is arranged such that an axis thereof extends along a height direction of the seat back 12. A pair of upper and lower stud bolts 38 (only one of the stud bolts is shown in FIG. 1) protrude backward with respect to the seat from an outer peripheral portion of this inflator 34.

A fastening portion 14A1 is provided at the rear wall portion 14A of the shell frame 14 in a manner corresponding to the stud bolt 38 of the inflator 34. The fastening portion 14A1 extends inward in the seat width direction from a rear end portion of the lateral wall portion 14B, and is opposed to the side airbag module 30 from the rear side with respect to the seat. A clip fixation portion 14A2 extends backward with respect to the seat from an inner end portion of this fastening portion 14A1 in the seat width direction, and a rear end portion of the clip fixation portion 14A2 is connected to an outer end portion of a body portion 14A3 of the rear wall portion 14A in the seat width direction.

The stud bolt 38 of the inflator 34 penetrates the base fabric of the side airbag 32 and the aforementioned fastening portion 14A1 to be screwed into a nut 40. Thus, the inflator 34 is fastened and fixed (subjected to so-called back face fastening) to the shell frame 14 together with the side airbag 32. A side collision ECU (not shown) that is mounted in a vehicle is electrically connected to this inflator 34. A side collision sensor (not shown) that detects a side collision is electrically connected to the side collision ECU.

The aforementioned lateral collision ECU activates the inflator 34 upon detecting (the unavoidableness of) a side collision based on a signal from the side collision sensor. Thus, the inflator 34 ejects gas in the side airbag 32, and the side airbag 32 inflates and deploys forward of the side support portion 12B that is located on the left side with respect to the seat, with respect to the seat. Incidentally, in the case where a pre-crash sensor that predicts (foresees) a side collision is electrically connected to the side collision ECU, the inflator 34 is configured to be activated when the side collision ECU predicts a side collision based on a signal from the pre-crash sensor.

A side support bladder 46 (an air bag) as a component of a side support adjustment mechanism 42 is disposed between the aforementioned side airbag module 30 and the pad side portion 18B of the seat back pad 18. An air supply source (not shown) is connected to this side support bladder 46 via an air supply tube (not shown). This air supply source is a component of the side support adjustment mechanism 42, and is constituted of an air supply pump, a changeover valve, a control unit and the like. For example, the control unit activates the air supply pump to supply air to the side support bladder 46 when an operation switch that is provided in the vehicular seat 10 is operated to one side, and activates the changeover valve to discharge air from the side support bladder 46 when the aforementioned operation switch is operated to the other side. Thus, the side support bladder 46 is configured to inflate and contract.

A paddle 48 (a turning plate) as a component of the side support adjustment mechanism 42 is disposed in a gap between the aforementioned side support bladder 46 and the pad side portion 18B. This paddle 48 is molded in the shape of a plate from, for example, a resin material, and an end portion of the paddle 48 on the rear side with respect to the seat is coupled to a clip 52 via a hinge 50. A through-hole that penetrates in the seat width direction is formed through the clip fixation portion 14A2 of the shell frame 14 in a manner corresponding to this clip 52. The clip 52 is fitted in and engaged with the through-hole from inside in the seat width direction.

The hinge 50 that couples the paddle 48 and the clip 52 to each other extends in a vertical direction of the seat back 12, and the paddle 48 can turn with respect to the clip 52 around an axis extending along the vertical direction of the seat back 12. This paddle 48 is constituted of a base portion 48A that extends forward with respect to the seat from the hinge 50, and an inclined portion 48B that diagonally extends forward with respect to the seat and outward in the seat width direction from a front end portion of the base portion 48A. The inclined portion 48B extends along the pad side portion 18B, and the side support bladder 46 is interposed between the inclined portion 48B and the side airbag module 30.

Furthermore, in the present embodiment of the invention, a base bracket 56 (a reaction force plate) that constitutes a movable portion of a support body 49 is disposed between the side support bladder 46 and the side airbag module 30. This base bracket 56 is molded in the shape of a plate from, for example, a resin material, and an end portion of the base bracket 56 that is located on the rear side with respect to the seat is coupled to the clip 52 via the foregoing hinge 50. This clip 52 constitutes a fixed portion of the support body 49. That is, in the present embodiment of the invention, the hinge 50 and the clip 52, which couple the paddle 48 to the shell frame 14, are shared as components of the support body 49.

The aforementioned base bracket 56 can turn with respect to the clip 52 around the hinge 50 (around the axis extending along the vertical direction of the seat back 12). This base bracket 56 is constituted of a base portion 56A that extends forward with respect to the seat from the hinge 50, a reception portion 56B that diagonally extends forward with respect to the seat and outward in the seat width direction from a front end of the base portion 56A, a front portion 56C that extends outward in the seat width direction from a front end of the reception portion 56B, and an abutment portion 56D that extends forward with respect to the seat from an outer end portion of the front portion 56C in the seat width direction. The base bracket 56 is located in an inflation and deployment region (a space in prospect of inflation and deployment) of the side airbag 32.

The reception portion 56B extends along the pad side portion 18B. A face (a reception face) of the reception portion 56B that is located inside in the seat width direction abuts on the side support bladder 46 from outside in the seat width direction. Besides, the abutment portion 56D abuts on a front end portion of the lateral wall portion 14B of the shell frame 14 from inside in the seat width direction. Therefore, the base bracket 56 is allowed to rotate inward in the seat width direction around the hinge 50, and is restrained from rotating outward in the seat width direction around the hinge 50.

Incidentally, although not shown in the drawings, in the vehicular seat 10 according to the present embodiment of the invention, the side support bladder 46, the paddle 48, the clip 52, and the base bracket 56 as components of the side support adjustment mechanism 42 are disposed in the side support portion 12B located on the right side with respect to the seat, symmetrically to those shown in FIG. 1. It should be noted, however, that the side airbag module 30 is not disposed in the side support portion 12B that is located on the right side with respect to the seat, and that the base bracket 56 that receives an inflation pressure of the side support bladder 46 is fixed in a non-displaceable manner to the lateral wall portion 14B of the shell frame 14 that is located on the right side with respect to the seat.

Operation and Effect

Next, the operation and effect of the present embodiment of the invention will be described.

In the vehicular seat 10 configured as described above, the skeleton of the seat back 12 is constituted by the shell frame 14. The side airbag module 30, and the side support bladder 46 as a component of the side support adjustment mechanism 42 are arranged inside the lateral wall portion 14B of the shell frame 14 in the seat width direction. Then, the base bracket 56 of the support body 49 is disposed between this side support bladder 46 and the side airbag module 30. This support body 49 is supported by the shell frame 14, and supports the side support bladder 46 from outside in the seat width direction (the other side of the sitting passenger) at the time of inflation of the side support bladder 46 (see FIG. 3). Thus, the side support bladder 46 can be inflated inward in the seat width direction (toward the sitting passenger). Therefore, the side support portion 12B can be moved inward in the seat width direction due to an inflation pressure of the side support bladder 46.

Figure 4:
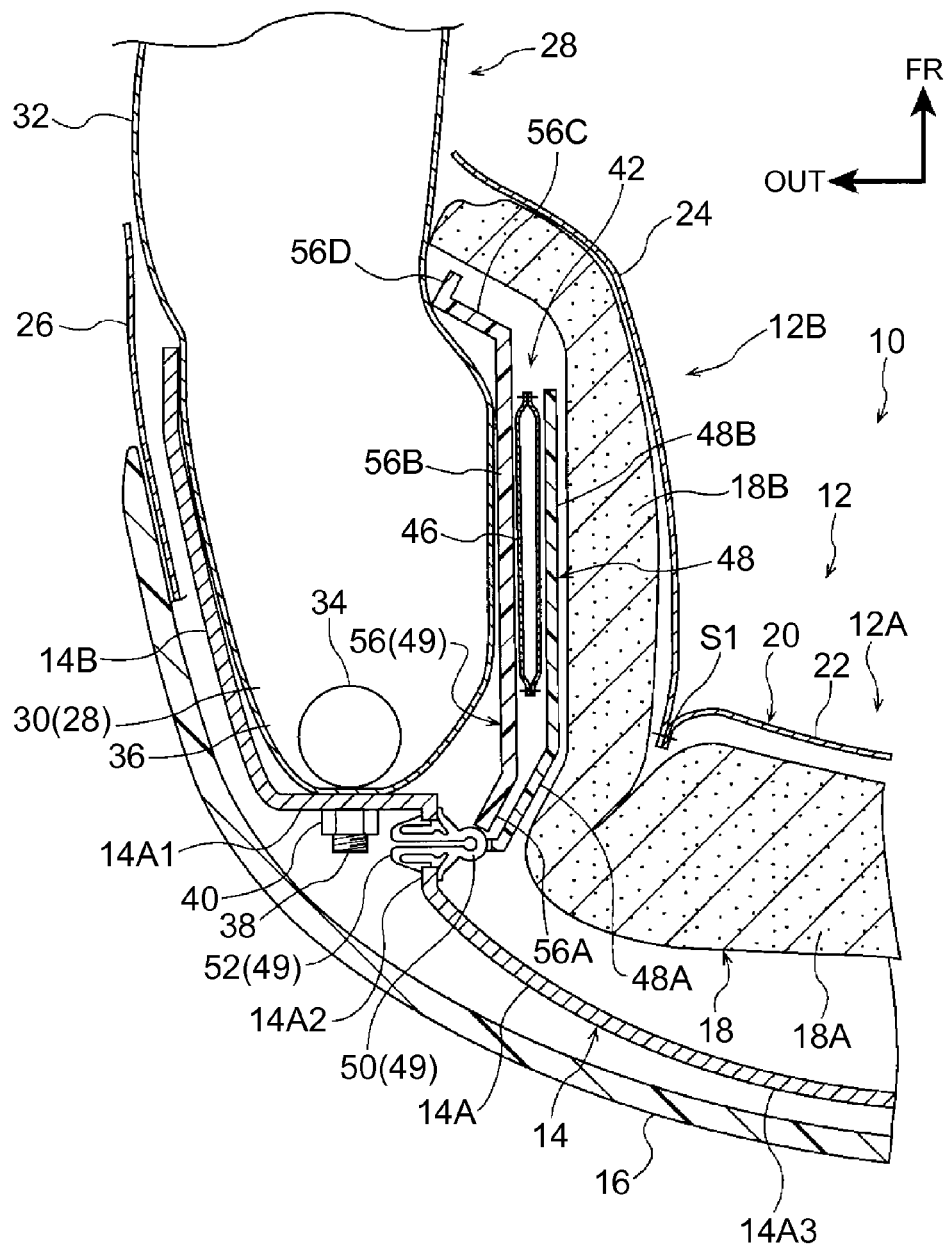
FIG. 4 is a planar cross-sectional view showing an inflated and deployed state of a side airbag, and corresponding to FIG. 1.

Moreover, as shown in FIG. 4, the base bracket 56 of this support body 49 is rotated (displaced) inward in the seat width direction around the hinge 50 together with the side support bladder 46 due to an inflation pressure of the side airbag 32 at the time of inflation and deployment of the side airbag 32. Thus, the inflation and deployment of the side airbag 32 can be prevented from being hindered by the base bracket 56. Therefore, the degree of freedom in arranging the side airbag module 30 with respect to the air bag-type side support adjustment mechanism 42 can be enhanced.

That is, in the present embodiment of the invention, both the side airbag module 30 and the side support bladder 46 are disposed inside the lateral wall portion 14B of the shell frame 14 in the seat width direction. The base bracket 56 that applies an inflation reaction force to the side support bladder 46 is usually located in the inflation and deployment region of the side airbag 32. From the standpoint of ensuring sitting comfort of the sitting passenger and the support performance of the side support portion 12B, this base bracket 56 is disposed at such a position as to hinder the deployment of the side airbag 32. However, as described above, the base bracket 56 is displaced inward in the seat width direction due to an inflation pressure of the side airbag 32, so the side airbag 32 can be inflated and deployed in a favorable manner. Accordingly, the side airbag module 30 is not required to be arranged such that the inflation and deployment region of the side airbag 32 does not overlap with the position where the base bracket 56 is disposed. As a result, the degree of freedom in arranging the side airbag module 30 is enhanced.

Moreover, in the present embodiment of the invention, the shell frame 14 is adopted. Therefore, the seat back 12 can be reduced in thickness, and the entire configuration of the vehicular seat 10 can be reduced in size. Besides, the air bag-type side support adjustment mechanism 42 is adopted. Therefore, the structure can be simplified, and the space, the number of parts, the mass, and the cost can be reduced in comparison with a case where a mechanical side support adjustment mechanism is adopted.

Furthermore, in the present embodiment of the invention, as shown in FIG. 4, the base bracket 56 is displaced inward in the seat width direction together with the side support bladder 46 and the paddle 48 at the time of inflation and deployment of the side airbag 32, so the side support portion 12B is pressed inward in the seat width direction to swell inward in the seat width direction (toward the sitting passenger). Thus, the performance of initially restraining the sitting passenger can be enhanced, so the injury index of the sitting passenger can be lowered.

Besides, in the present embodiment of the invention, the side airbag 32 is arranged inside the lateral wall portion 14B of the shell frame 14 in the seat width direction. Therefore, the side airbag 32 can be restrained from inflating outward in the seat width direction by the lateral wall portion 14B at the time of inflation and deployment of the side airbag 32. Thus, the side airbag 32 can be inflated and deployed forward with respect to the seat at an early stage, and the performance of initially restraining the passenger by the side airbag 32 can be enhanced.

Still further, in the present embodiment of the invention, the abutment portion 56D that is provided at the front end portion of the base bracket 56 usually abuts on the lateral wall portion 14B of the shell frame 14 from inside in the seat width direction. Therefore, when the side support bladder 46 inflates, the base bracket 56 can be firmly supported from outside in the seat width direction due to the rigidity of the shell frame 14. Thus, the base bracket 56 can be prevented or effectively restrained from being inadvertently displaced outward in the seat width direction. Therefore, the reaction force from the base bracket 56 can be applied to the side support bladder 46 in a favorable manner.

Besides, in the present embodiment of the invention, the end portion of the base bracket 56 that is located on the rear side with respect to the seat is coupled to the clip 52 via the hinge 50. The base bracket 56 is configured to be allowed to rotate inward in the seat width direction around the hinge 50, and to be restrained from rotating outward in the seat width direction around the hinge 50. In this manner, the base bracket 56 is configured to be rotated around the hinge 50. Therefore, the base bracket 56 can be smoothly displaced inward in the seat width direction.

Furthermore, in the present embodiment of the invention, when the side support bladder 46 inflates inward in the seat width direction, the paddle 48 rotates inward in the seat width direction around the hinge 50. The pad side portion 18B can be efficiently pressed inward in the seat width direction by this paddle 48. Moreover, the hinge 50 to which the paddle 48 is coupled couples the base bracket 56 to the clip 52, and the hinge 50 and the clip 52 are shared. Therefore, the number of parts can be reduced.

Besides, in the present embodiment of the invention, the side airbag module 30 is arranged inside the lateral wall portion 14B of the shell frame 14 (the side frame portion) in the seat width direction. Therefore, the lateral wall portion 14B can be arranged more outward in the seat width direction than in a configuration in which the side airbag module 30 is arranged outside the lateral wall portion 14B in the seat width direction. Besides, the base bracket 56, the paddle 48 and the like that are arranged inside the lateral wall portion 14B in the seat width direction can be manufactured with lower rigidity than the shell frame 14. Therefore, in the event of a rear collision of the vehicle, the sitting passenger that is about to move through inertia backward of the seat back 12 with respect to the vehicle can be slipped into the seat back 12 in a favorable manner. As a result, the head of the sitting passenger can be brought into abutment on a headrest at an early stage, so the performance of protecting the neck of the sitting passenger can be enhanced.

Besides, in the present embodiment of the invention, the base portion 56A extends backward with respect to the seat from the rear end portion of the reception portion 56B of the base bracket 56, and the rear end portion of the base portion 56A is coupled to the clip 52 via the hinge 50. Thus, the length dimension of the reception portion 56B in a planar cross-sectional view can be set long while restraining the space for arrangement of the base bracket 56 from being enlarged inward in the seat width direction.

Besides, in the present embodiment of the invention, the fastening portion 14A1 that is provided on the shell frame 14 is opposed to the side airbag module 30 from the rear side with respect to the seat. Therefore, at the time of inflation and deployment of the side airbag 32, the front face of the fastening portion 14A1 functions as a reaction force face that applies an inflation reaction force to the side airbag 32. Thus, the inflation and deployment performance of the side airbag 32 can be made favorable.

(Supplemental Explanation of First Embodiment) The aforementioned first embodiment of the invention adopts a configuration in which the hinge 50 and the clip 52 are shared, by the base bracket 56 and the paddle 48, but the invention is not limited thereto. It is also appropriate to adopt a configuration in which the base bracket 56 and the paddle 48 are provided separately with a hinge and a clip.

Besides, the aforementioned first embodiment of the invention adopts a configuration in which the paddle 48 (the turning plate) is provided, but the invention is not limited thereto. It is also possible to adopt a configuration in which the turning plate is omitted.

Furthermore, the support body 49 of the aforementioned first embodiment of the invention is configured such that the base bracket 56 (the movable portion) is rotatably coupled to the clip 52 (the fixed portion) via the hinge 50, but the invention is not limited thereto. The support body 49 may also be configured such that the base bracket 56 is formed integrally with the clip 52. In that case, for example, at the time of inflation and deployment of the side airbag, the clip 52 leaves the skeleton of the seat back due to an inflation pressure of the side airbag, so the support body 49 can be displaced inward in the seat width direction.

Besides, although the case where the skeleton of the seat back 12 is constituted by the shell frame 14 has been described in the aforementioned first embodiment of the invention, the invention is not limited thereto. The skeleton of the seat back 12 may also be constituted by a normal seat back frame that is equipped with right and left side frame portions, and an upper frame portion that couples upper end portions of the right and left side frame portions to each other in the seat width direction. In that case, for example, the side frame portion is constituted by the lateral wall portion 14B, the fastening portion 14A1, and the clip fixation portion 14A2 in the aforementioned first embodiment of the invention, and the body portion 14A3 is omitted.

Next, other embodiments of the invention will be described. Incidentally, the configuration and operation basically similar to those of the first embodiment of the invention are denoted by the same reference symbols as in the first embodiment of the invention, and the description thereof will be omitted.

Second Embodiment

Figure 5:
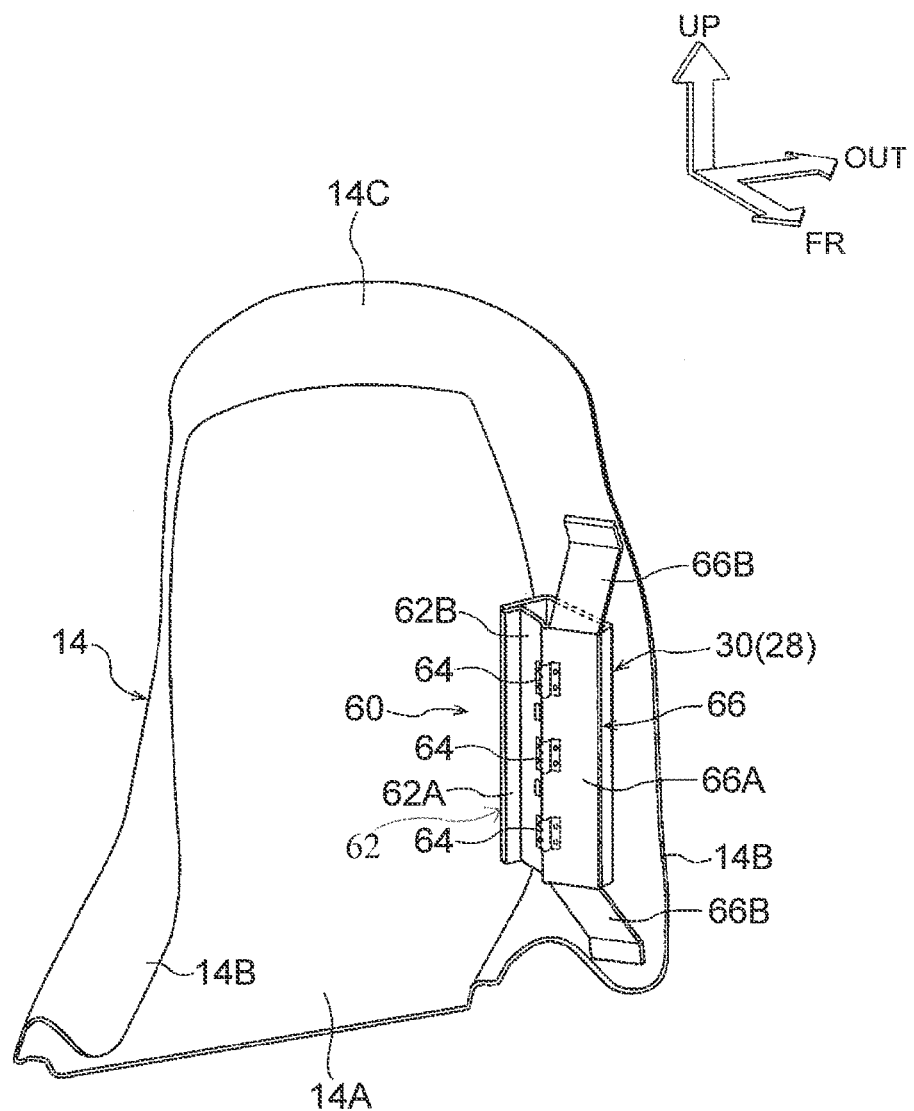
FIG. 5 is a perspective view showing the configuration of peripheral members including a shell frame of a seat back of a vehicular seat according to a second embodiment of the invention.

In FIG. 5, the partial configuration of a vehicular seat according to the second embodiment of the invention is shown in the form of a perspective view corresponding to FIG. 2. This embodiment of the invention is basically similar in configuration to the first embodiment of the invention, but a support body 60 is different in configuration from the support body 49 according to the first embodiment of the invention. This support body 60 is equipped with a fixed bracket 62 as a fixed portion.

The fixed bracket 62 is constituted of a fixed portion 62A that is fixed to a front face of the rear wall portion 14A of the shell frame 14, and a front extension portion 62B that extends toward the front side with respect to the seat from an outer end portion of the fixed portion 62A in the seat width direction. The fixed portion 62A and the front extension portion 62B assume the shape of a flat plate. Incidentally, in the case where the material of the shell frame 14 is carbon etc., the fixed bracket 62 may be formed integrally with the shell frame 14.

A reception face bracket 66 as a movable portion is coupled to a front end portion of the front extension portion 62B of the fixed bracket 62 via a plurality of (three in this case) hinges 64 that are vertically aligned with one another. This reception face bracket 66 can rotate with respect to the fixed bracket 62 around the hinges 64 (around an axis extending along the vertical direction of the seat back). This reception face bracket 66 is constituted of a reception portion 66A that is interposed between the side airbag module 30 and the side support bladder 46 (which is not shown in FIG. 5), and a pair of upper and lower frame touch portions 66B (abutment portions) that are extended from both upper and lower end portions of the reception portion 66A respectively.

The reception portion 66A is formed in the shape of a flat plate, and an inner face of the reception portion 66A in the seat width direction abuts on the side support bladder 46 (which is not shown in FIG. 5). The upper frame touch portion 66B extends upward with respect to the seat and outward in the seat width direction from the reception portion 66A, and an upper end portion (an outer end portion in the seat width direction) of the upper frame touch portion 66B abuts on the inner face of the lateral wall portion 14B of the shell frame 14 in the seat width direction. The lower frame touch portion 66B extends downward with respect to the seat and outward in the seat width direction from the reception portion 66A, and a lower end portion (an outer end portion in the seat width direction) of the lower frame touch portion 66B abuts on the inner face of the lateral wall portion 14B of the shell frame 14 in the seat width direction. The upper end portion of the upper frame touch portion 66B and the lower end portion of the lower frame touch portion 66B are flexed along the lateral wall portion 14B, and is formed in surface contact with the lateral wall portion 14B.

This reception face bracket 66 is allowed to rotate inward in the seat width direction around the hinges 64, and is restrained from rotating outward in the seat width direction around the hinges 64 due to abutment of the upper and lower frame touch portions 66B on the lateral wall portion 14B. This embodiment of the invention is basically identical in the configurational details other than the foregoing to the first embodiment of the invention.

In this embodiment of the invention as well as the first embodiment of the invention, at the time of inflation of the side support bladder 46, an inflation reaction force can be applied to the side support bladder 46 by the reception face bracket 66. At the time of inflation and deployment of the side airbag 32, the reception face bracket 66 rotates outward in the seat width direction around the hinges 64 together with the side support bladder 46 upon receiving an inflation pressure of the side airbag 32, so the side airbag 32 can be allowed to inflate and deploy. Accordingly, this embodiment of the invention achieves an operation and an effect that are basically similar to those of the first embodiment of the invention.

Third Embodiment

Figure 6:
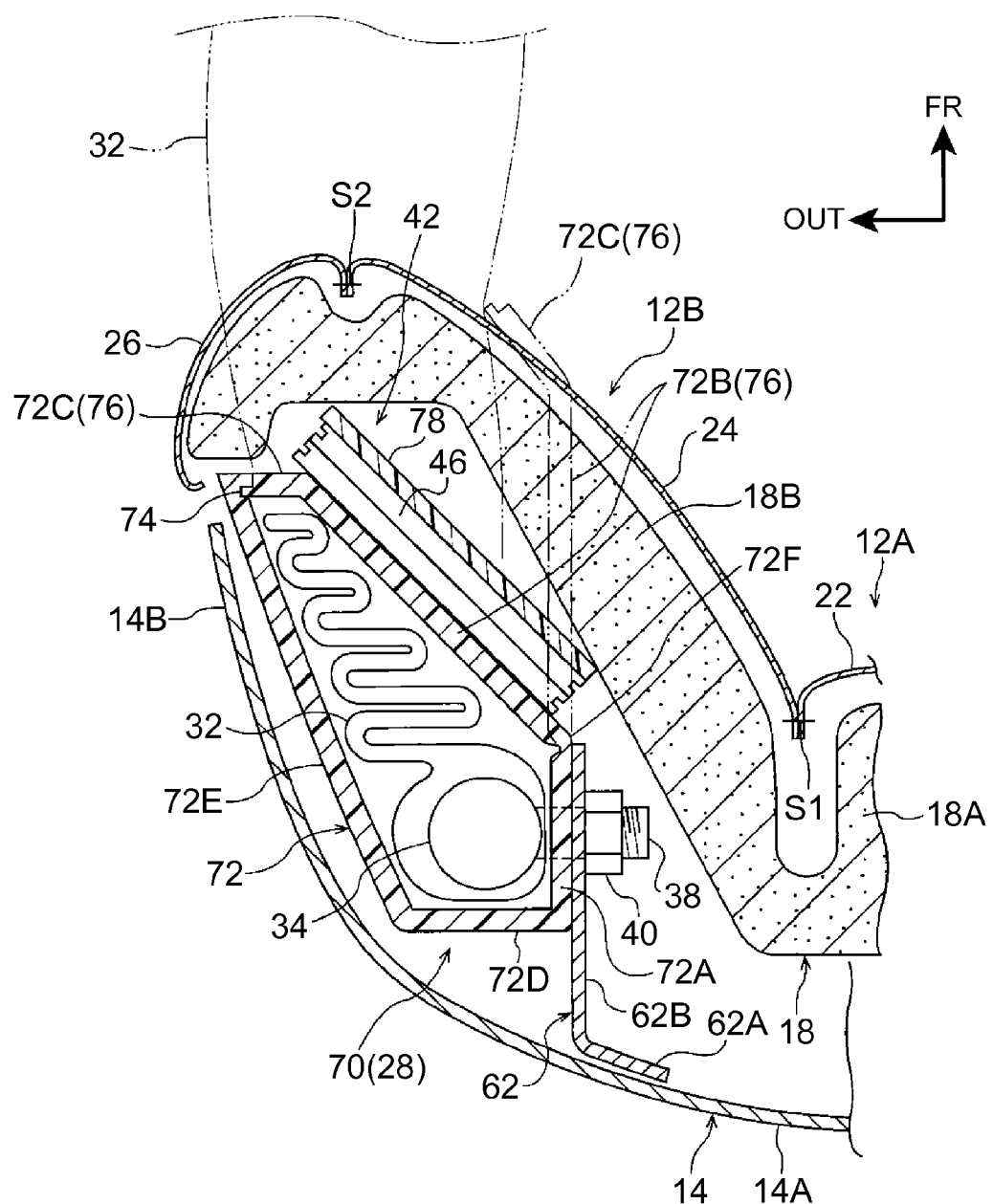
FIG. 6 is a planar cross-sectional view showing the configuration around a side support portion of the seat back of a vehicular seat according to a third embodiment of the invention, and corresponding to a line F6-F6 of FIG. 7.

In FIG. 6, the partial configuration of a vehicular seat according to the third embodiment of the invention is shown in the form of a transverse cross-sectional view corresponding to FIG. 1. In this embodiment of the invention, the backboard 16 in the first embodiment of the invention is omitted, and the design of the back face and the lateral faces of the seat back 12 is constituted by the shell frame 14 itself. Thus, the configuration of the seat back 12 is simplified.

Besides, in this embodiment of the invention, the fixed bracket 62 similar to that of the second embodiment of the invention is provided, and an airbag module 70 is fixed to the fixed bracket 62. As is the case with the airbag module 30 in the first embodiment of the invention, this airbag module 70 is equipped with the side airbag 32 and the inflator 34, and is arranged inside the lateral wall portion 14B of the shell frame 14 in the seat width direction together with the side support bladder 46. It should be noted, however, that this airbag module 70 is equipped with an airbag case 72 as opposed to the first embodiment of the invention.

Figure 7:
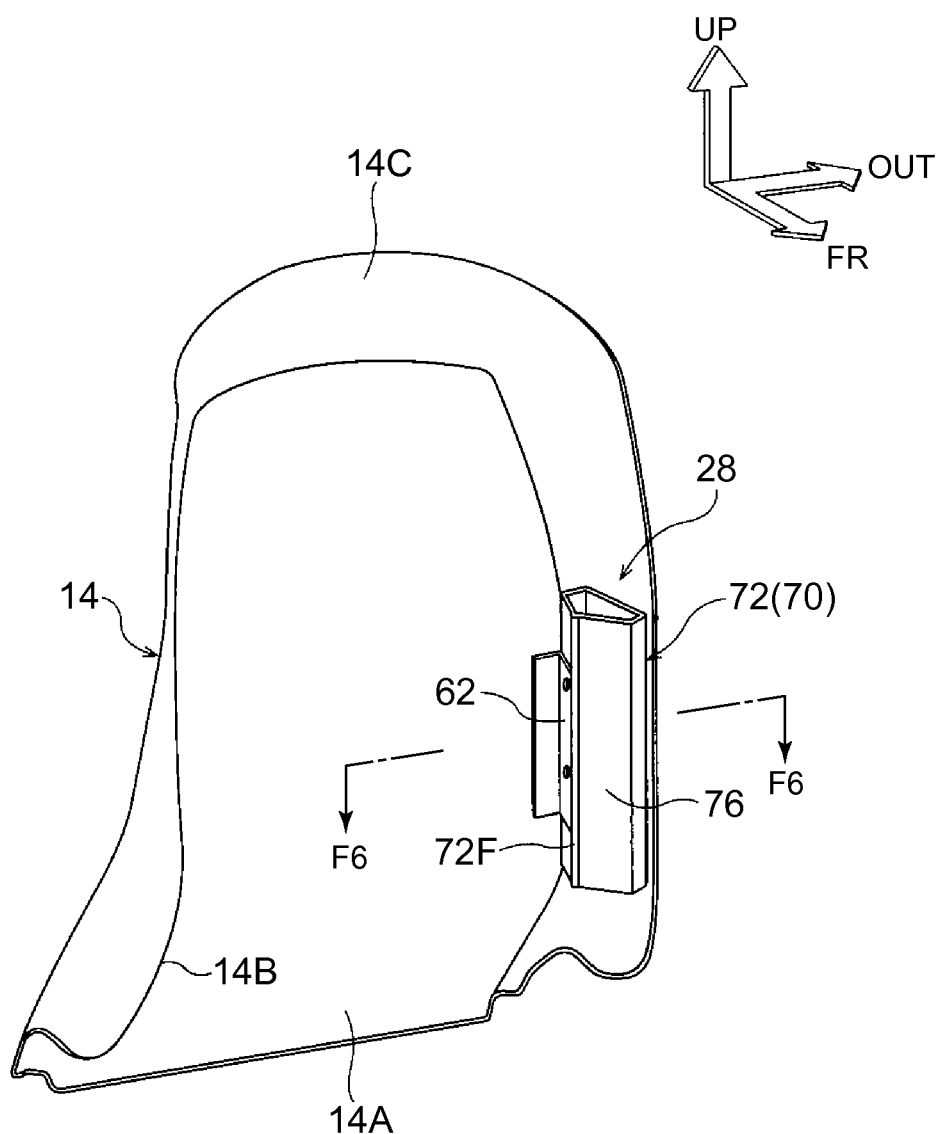
FIG. 7 is a perspective view showing the configuration of peripheral members including a shell frame as a skeleton of the seat back.

The airbag case 72 is molded from, for example, a resin material, and is formed in the shape of a cylinder with a pentagonal cross-section (see FIG. 7). This airbag case 72 is constituted of a fastening wall 72A that abuts on an outer face of the front extension portion 62B of the fixed bracket 62 in the seat width direction, a reception face wall 72B that diagonally extends forward with respect to the seat and outward in the seat width direction from a front end portion of the fastening wall 72A, a front wall 72C that extends outward in the seat width direction from a front end portion of the reception face wall 72B, a rear wall 72D that extends outward in the seat width direction from a rear end portion of the fastening wall 72A, and an outer wall 72E that diagonally extends forward with respect to the seat and outward in the seat width direction from an outer end portion of the rear wall 72D in the seat width direction.

The side airbag 32 that is folded in such a state as to accommodate the inflator 34 therein is accommodated inside the airbag case 72. The stud bolt 38 of the inflator 34 penetrates the base fabric of the side airbag 32, the fastening wall 72A, and the front extension portion 62B, and is screwed into the nut 40. Thus, the side airbag module 70 that is configured to include the airbag case 72 is fastened and fixed (subjected to so-called lateral face fastening) to the shell frame 14 via the fixed bracket 62.

A cutting line 74 that is formed in the shape of a crank in a planar cross-sectional view is set between the front wall 72C and the outer wall 72E of the airbag case 72. In a fitting structure on the cutting line 74, an outer end portion of the front wall 72C in the seat width direction is separably fitted to a front end portion of the outer wall 72E. Besides, an integral hinge 72F is provided between a rear end portion of the reception face wall 72B and a front end portion of the fastening wall 72A.

Therefore, when the side airbag 32 inflates due to the activation of the inflator 34, the aforementioned fitting of the front wall 72C and the outer wall 72E is cancelled due to an inflation pressure of the side airbag 32, and the reception face wall 72B and the front wall 72C are rotated (displaced) outward in the seat width direction around the integral hinge 72F. Thus, the airbag case 72 is opened forward with respect to the seat, and the side airbag 32 inflates and deploys forward of the side support portion 12B with respect to the seat (see an alternate long and two short dashes line of FIG. 6).

On the other hand, the reception face wall 72B and the front wall 72C are restrained from being rotated (displaced) outward in the seat width direction around the integral hinge 72F, due to abutment of the outer end portion (a touch portion) of the front wall 72C in the seat width direction on a front end portion of the outer wall 72E. That is, this reception face wall 72B and this front wall 72C are configured to be allowed to rotate inward in the seat width direction around the integral hinge 72F, and to be restrained from rotating outward in the seat width direction around the integral hinge 72F. Then, in the present embodiment of the invention, the support body 76 is constituted of this reception face wall 72B and this front wall 72C (i.e., part of the airbag case 72). This support body 76 is supported by the shell frame 14 via the fastening wall 72A and the fixed bracket 62.

Figure 8:
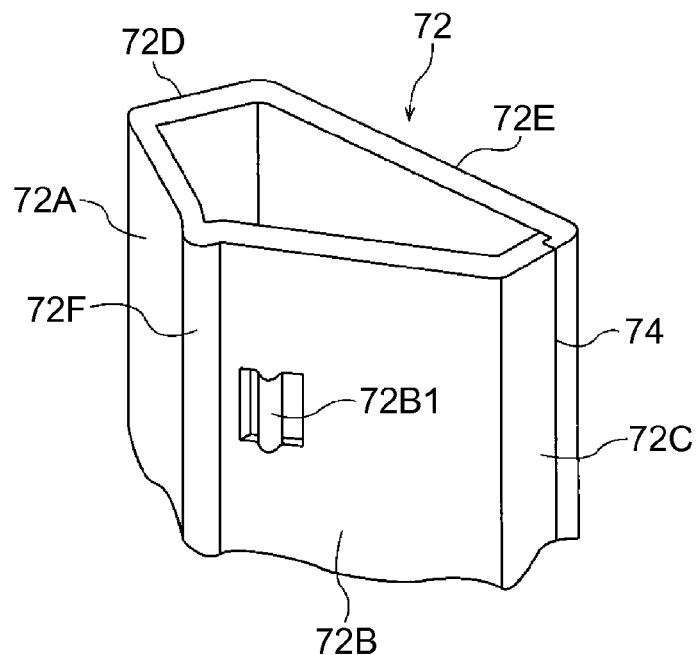
FIG. 8 is an exploded perspective view showing the partial configuration of an airbag case, a side support bladder, and a paddle as components of the vehicular seat.
Figure 8:
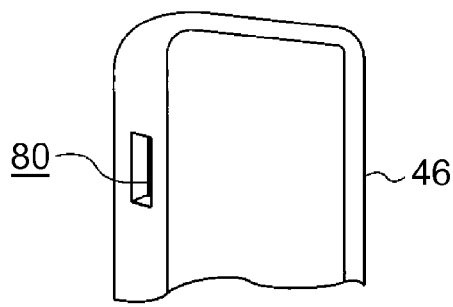
Figure 8:
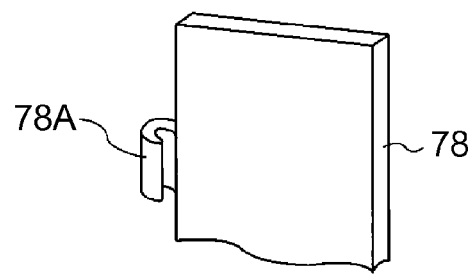

The side support bladder 46 abuts on an inner face of the aforementioned reception face wall 72B in the seat width direction, and a paddle 78 as a turning plate is provided between the side support bladder 46 and the pad side portion 18B. This paddle 78 is formed of, for example, a resin material, and is formed in the shape of a flat plate as shown in FIG. 8. A hook portion 78A that is formed substantially in a J-like shape in a planar cross-sectional view is provided at a rear end edge portion of this paddle 78.

A hook shaft 72B1 that extends along the vertical direction of the seat back 12 in the axial direction is integrally formed at a rear end portion of the reception face wall 72B in a manner corresponding to the aforementioned hook portion 78A. The hook portion 78A is inserted through a rectangular through-hole 80 that is formed through a rear end portion of the side support bladder 46, and is hooked on the hook shaft 72B1. This hook portion 78A and this hook shaft 72B1 constitute a hinge 72F, and the paddle 78 is rotatably coupled to the airbag case 72 around the hinge 72F.

Therefore, when the side support bladder 46 inflates, the paddle 78 turns inward in the seat width direction around the hinge 72F. When the side support portion 12B swells inward in the seat width direction and the side support bladder 46 contracts, the paddle 78 turns outward in the seat width direction around the hinge 72F, and the side support portion 12B retreats outward in the seat width direction. This embodiment of the invention is basically identical in the configurational details other than the foregoing to the first embodiment of the invention.

In this embodiment of the invention as well as the first embodiment of the invention, when the side support bladder 46 inflates, an inflation reaction force can be applied to the side support bladder 46 by the support body 76 (the reception face wall 72B and the front wall 72C) that is provided on the airbag case 72. Besides, when the side airbag 32 inflates and deploys, the aforementioned support body 76 rotates outward in the seat width direction around the integral hinge 72F together with the side support bladder 46 and the paddle 78 upon receiving an inflation pressure of the side airbag 32, so the side airbag 32 can be allowed to inflate and deploy. Accordingly, this embodiment of the invention achieves an operation and an effect that are basically similar to those of the first embodiment of the invention.

Besides, in this embodiment of the invention, the airbag module 70 itself is made use of as the reception face of the side support bladder 46. Therefore, the structure can be simplified, and the number of parts can be reduced. Besides, the support body 76 can be assembled with the shell frame 14 by assembling the side airbag module 70 with the shell frame 14. Therefore, the man-hour of an assembling operation can be reduced in comparison with a case where the side airbag module and the support body are separately assembled with the shell frame.

The invention has been described above with reference to some embodiments thereof. However, the invention is not limited to these embodiments thereof, but can be carried out after being modified in various manners without departing from the gist thereof. Besides, as a matter of course, the scope of rights of the invention is not limited to the aforementioned respective embodiments thereof.

What is claimed is:

1. A vehicular seat comprising:
    a side airbag device that inflates and deploys a side airbag with which a side airbag module that is provided in a side support portion of a seat back is equipped, forward of the side support portion with respect to the seat;
    a side support adjustment mechanism that has an air bag that is provided in the side support portion inside the side airbag module in a seat width direction, and that inflates and contracts the air bag; and
    a support body that is provided between the side airbag module and the air bag, that is supported by a skeleton of the seat back, that supports the air bag from outside in the seat width direction at a time of inflation of the air bag, and that is displaced inward in the seat width direction together with the air bag due to an inflation pressure of the side airbag at a time of inflation and deployment of the side airbag.

2. The vehicular seat according to claim 1, wherein
    the support body has an abutment portion that abuts on the skeleton of the seat back from inside in the seat width direction.

3. The vehicular seat according to claim 1, wherein
    the skeleton of the seat back is a shell frame having a rear wall portion that is arranged on a back face side of the seat back, and a lateral wall portion that extends forward with respect to the seat from an end portion of the rear wall portion in the seat width direction, and
    the side airbag module and the air bag are arranged inside the lateral wall portion in the seat width direction.

4. The vehicular seat according to claim 1, wherein
    the support body has a fixed portion that is fixed to the skeleton of the seat back, and a movable portion that is coupled at an end portion thereof on a rear side with respect to the seat to the fixed portion via a hinge and that is arranged between the side airbag module and the air bag, and the movable portion is allowed to rotate inward in the seat width direction around the hinge, and is restrained from rotating outward in the seat width direction around the hinge.

5. The vehicular seat according to claim 4, wherein the side support adjustment mechanism has a turning plate that is interposed between the air bag and a seat back pad in the side support portion, and the turning plate is coupled at an end portion thereof on the rear side with respect to the seat to the fixed portion via the hinge.

6. The vehicular seat according to claim 1, wherein the side airbag module is equipped with an airbag case that accommodates the side airbag therein in a folded state, and the support body is constituted by a part of the airbag case.

7. The vehicular seat according to claim 6, wherein the support body has an abutment portion that abuts on another part of the airbag case from inside in the seat width direction.

8. The vehicular seat according to claim 7, wherein the side support adjustment mechanism has a turning plate that is interposed between the air bag and a seat back pad in the side support portion, and the turning plate is coupled to a hook shaft that is formed on a part of the support body, via a hook portion that is provided at an end portion of the turning plate on a rear side with respect to the seat.

* * * * *